June 9, 1964

A. F. SCHOTT 3,136,076

EDUCATIONAL TOOL ADAPTED TO FACILITATE TEACHING THE ARITHMETIC OF FRACTIONS

Filed May 29, 1959

*Fig. 2* Cumulative Fractional-Decimal Scale

*Fig. 3* Fractional Parts

INVENTOR
ANDREW F. SCHOTT

BY Wheeler, Wheeler & Wheeler ATTYS.

June 9, 1964

A. F. SCHOTT 3,136,076

EDUCATIONAL TOOL ADAPTED TO FACILITATE TEACHING
THE ARITHMETIC OF FRACTIONS

Filed May 29, 1959

INVENTOR
ANDREW F. SCHOTT

Wheeler, Wheeler & Wheeler
ATTORNEYS

June 9, 1964
A. F. SCHOTT
3,136,076
EDUCATIONAL TOOL ADAPTED TO FACILITATE TEACHING
THE ARITHMETIC OF FRACTIONS
Filed May 29, 1959
5 Sheets-Sheet 3
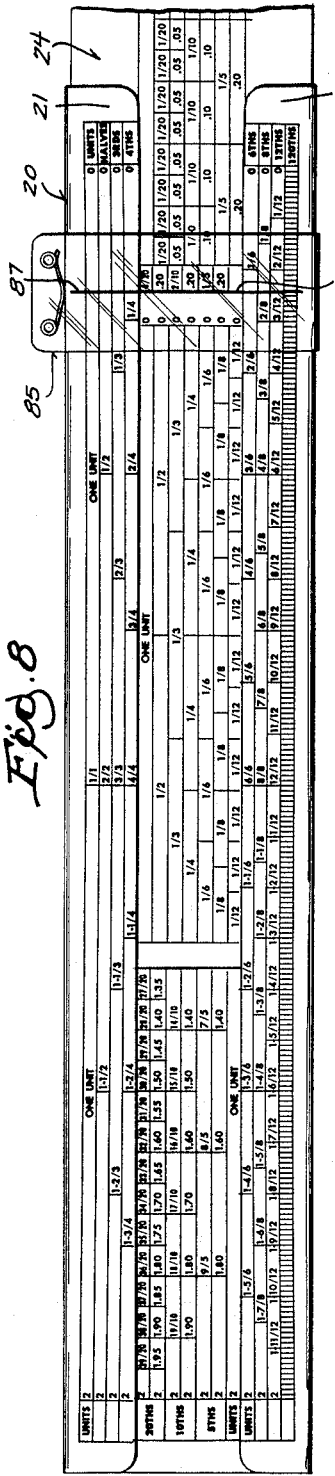
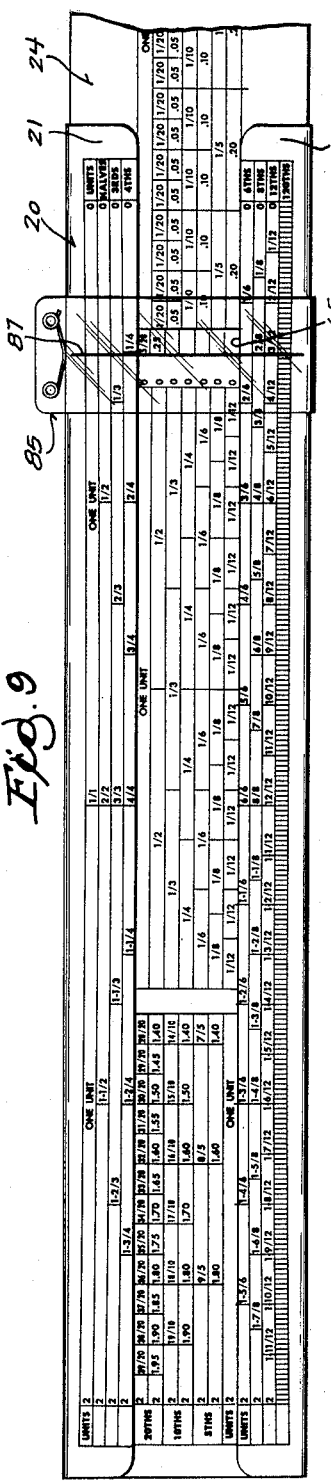
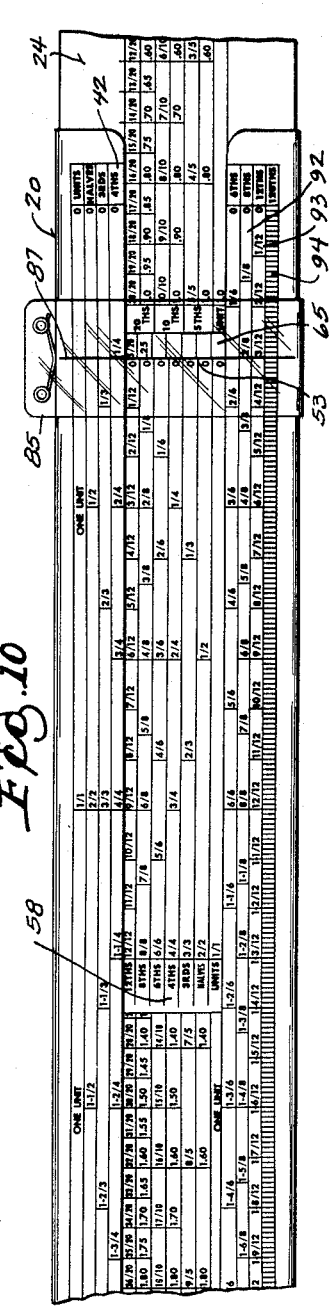
INVENTOR
ANDREW F. SCHOTT
Wheel, Wheeler & Wheeler
ATTORNEYS June 9, 1964

A. F. SCHOTT 3,136,076

EDUCATIONAL TOOL ADAPTED TO FACILITATE TEACHING
THE ARITHMETIC OF FRACTIONS

Filed May 29, 1959

INVENTOR
ANDREW F. SCHOTT

Wheeler, Wheeler & Wheeler
ATTORNEYS

June 9, 1964

A. F. SCHOTT 3,136,076

EDUCATIONAL TOOL ADAPTED TO FACILITATE TEACHING
THE ARITHMETIC OF FRACTIONS

Filed May 29, 1959

INVENTOR
ANDREW F. SCHOTT

Wheeler, Wheeler & Wheeler
ATTORNEYS

United States Patent Office 3,136,076
Patented June 9, 1964

3,136,076
EDUCATIONAL TOOL ADAPTED TO FACILITATE TEACHING THE ARITHMETIC OF FRACTIONS
Andrew F. Schott, 205 N. Park Blvd., Brookfield, Wis.
Filed May 29, 1959, Ser. No. 816,892
12 Claims. (Cl. 35—31)

This invention relates to an educational tool adapted to facilitate teaching the arithmetic of fractional parts, fractions, decimals, percents, and the interrelations between fractional parts, fractions, decimals and percents. More particularly, the invention relates to a slide rule having scales graduated in fractions and decimals, and in which the scales are so oriented on the various parts of the rule and with respect to each other that a child can manipulate the rule for graphic demonstration which will lead to a basic understanding of the principles of the arithmetic of fractional parts, fractions, decimals and percent.

The slide rule of the present invention is not particularly intended nor designed to be used as a working tool for the solution of problems involving fractions, decimals and percents. Once the student learns the arithmetic of fractions, decimals and percents, such problems can frequently be more rapidly solved mentally or on paper than they can be solved with the slide rule herein disclosed. However, for an elementary grade pupil who has had no prior exposure to fractions, decimals and percents, or to arithmetic problems involving fractions, decimals and percents, the slide rule of the present invention helps the pupil grasp quickly the basic principles and generalizations of fractions, decimals and percents, and to demonstrate for himself the development, accuracy and efficiency of such principles and generalizations.

The slide rule of the present invention relates decimals to their equivalent fractions, so that the pupil can verify his solution to problems involving fractions by determining their decimal equivalents, with which the slide rule is graduated, and gain an understanding of decimals and the decimal processes.

The teaching method based upon the use of the slide rule of the present invention seeks to help the student establish, by inductive methods, generalizations of the basic principles for mathematical relations and computations involving fractions, decimals and percents. These mathematical relations and computations include:

(1) Adding and subtracting fractions, decimal equivalents of fractions, and percents.

(2) Determination of decimal equivalents of a fraction and percents.

(3) Determination of the fractional equivalent of a decimal.

(4) Visualizing fractional and decimal parts of a whole.

(5) Multiplication of fractions and decimals.

(6) Arithmetic of complex numbers and improper fractions and mixed decimals.

The slide rule of the present invention is characterized by several unique features which particularly adapt it for correlation with written notation of numbers. Accordingly, the pupil's experience with the slide rule of the present invention will be consistent with prior use of numerical notations, thus to ease the transition between use of the slide rule of the present invention and the performance of written and mental arithmetic computations. The following features are among those which characterize the slide rule of the invention:

(1) All numerical notations on the slide rule elements are arranged in increasing order from right to left, thus to simulate conventional arithmetic written notation.

(2) The base scales each have a maximum reading of 2. The scales on the slide each have a maximum reading of 1. This particular arrangement is especially suited because the fractional or decimal part of any number is always less than 1 and the addition of two such fractional or decimal parts will never exceed 2.

(3) Fractions and decimals are inscribed on the slide rule in side by side relationship for continuous cross check between decimal and fractional answers of arithmetic problems.

(4) The slide may be made to cover and thus obscure from view a portion of the base scale. However, by providing a window in the slide, computations appearing on the base scale beneath the slide are exposed through the window.

Even after the student has learned the arithmetic of fractions so that problems involving fractions, decimals and percents can be performed mentally or on paper by using conventional written notations, the slide rule of the present invention can be used as a verifying tool to check the answer computed mentally or by using conventional written notation.

Other objects, advantages and features of the invention will appear from the following disclosure in which:

FIG. 1 is a face view of the base member of a slide rule embodying the present invention, the slide having been removed.

FIG. 2 is a face view of one side of the slide member shown removed from the base member, this side of the slide being inscribed with cumulative fractional and decimal scales.

FIG. 3 is a reverse face view of the slide of FIG. 2 and on which are inscribed scales graduated in fractional and decimal parts.

FIG. 4 is a face view showing the assembled slide rule, the slide face shown in FIG. 2 being uppermost.

FIG. 5 is a cross section taken along the line 5—5 of FIG. 4.

FIGS. 6 to 9 are face views illustrating various steps in the use of the slide rule to demonstrate how fractional parts and decimals can be accumulated to equal a cumulative fraction.

FIGS. 10 to 14 are face views illustrating various steps in the use of the slide rule to add and subtract fractions and decimals, using the cumulative fractional side of the slide.

The slide rule has a channel-shaped base member 20 with flanges 21, 22 spaced forwardly from the back 23 and thus providing a channel way within which is received the slide 24. The respective flanges 21, 22 have their mutually proximate margins spaced laterally to provide a gap 25 through which the scales on the exposed face of the slide 24 and the uncovered portion of back 23 are readily visible.

As best shown in FIG. 1, the base 20 has a series of scales respectively inscribed upon its flanges 21, 22 and on the portion of its back 23 which is visible through the gap 25.

The graduations of the scales on the flanges 21, 22 and back 23 all start from zero at 0-line 26 near the right-hand end of the base member 20 and increase in numerical value reading from right to left. At approximately the center of the base 20 there is an index line 27 at a numerical value on all the scales equal to unity and near the extreme left end of the base there is another index line 28 at a numerical value on all the base scales equal to 2. All the scales on the base are cumulative from right to left.

The top scale 31 on flange 21 is a unit scale in which the distances respectively between index lines 26 and 27 and between index lines 27 and 28 represent one unit.

The next scale 32 has a subdivision line 33 midway between index lines 26, 27 marked ½. At line 27 this scale is marked 2/2. Between index lines 27 and 28 scale 32 has another subdivision line 34 marked 1½. At index line 28 scale 32 is marked 2. Accordingly, scale 32 is divided into segments each equal to one-half of a whole unit. Scale 32 bears the legend "halves."

The next scale 35 bearing the legend "3rds" is divided into three parts between index lines 26, 27 and thus has two subdivision lines 36, 37 respectively bearing the legends ⅓ and ⅔. At index line 27, this scale is marked 3/3. Between index lines 27 and 28 scale 35 has subdivision lines 38, 39 marked respectively 1⅓ and 1⅔. At index line 28, scale 35 is marked 2.

Flange 21 has an additional scale 42 divided in a similar fashion into fourths which will be clear from inspection of the drawings. This scale bears the legend "4ths."

Flange 22 has additional parallel scales 91, 92, 93 and 94, respectively divided into 6ths, 8ths, 12ths and 120ths. Detailed description of the various subdivisions of these scales is unnecessary to an understanding thereof, inasmuch as they are obvious from inspection of the drawing.

The graduations on the exposed portion of the back 23 are divided into scales 95, 96 and 97 for 5ths, 10ths and 20ths, in addition to a "units" scale 98.

The 5ths, 10ths and 20ths scale aforesaid, in addition to having fractional notations for the various subdivisions thereof, have decimal equivalents inscribed thereon. For example, scale 97 for 20ths has a first subdivision line 44, which, in addition to the fractional notation 1/20 has the decimal notation .05. Each subdivision for the fractional scales on the exposed portion of back 23 has a decimal equivalent for the fraction at each subdivision thereof.

All of the scales thus far described are cumulative. For example, subdivision 38 on scale 35 marked 1⅓ is a cumulative fraction representing the sum of the fractional parts between subdivision line 38 and the 0-line 26. The decimal equivalents are also cumulative. When the "Cumulative Fraction-Decimal Scale" side of the slide 24, as shown in FIG. 2, is placed into the channel of the base member 20, both the slide member and the base member will have scales graduated in cumulative fractions and decimals.

Turning now to the "Cumulative Fraction-Decimal Scale" on the face of the slide 24 exposed in FIG. 2, it will be noted that near the right-hand end of the scale there is a 0-line 45 and near the middle of the scale there is an index line 46 for unity. The distance between index lines 45 and 46 is identical to the distance between index lines 26 and 27 on the base member 20. There are a series of scales 47, 48, 49, 50 between the index lines 45, 46, these being respectively graduated in and legended units, 5ths, 10ths and 20ths. As in the case of the scales on the exposed portion of the back 23 of base member 20, each of these scales is graduated both in fractions and in decimal equivalents. The portion of the slide thus far described will be referred to as the right side set of scales.

There is also a left side set of scales between a 0-line 53 and index line 54 at unity at the extreme left end of the slide 24 and upon which scales 55, 56, 57, 58, 59, 60 and 61 are inscribed. Scales 55 through 61 are respectively graduated in fractions for units, halves, 3rds, 4ths, 6ths, 8ths, and 12ths. All the scales, both fractional and decimal, on the face of slide 24 exposed in FIG. 2 are cumulative. Unlike the scales on the base member 20, however, the scales shown in FIG. 2 have a maximum numerical value of 1. Accordingly, each scale is only one-half the total length of any scale on the base member shown in FIG. 1. This arrangement takes advantage of the fact that true fractions are always less than 1 and the addition of any fraction on any of the scales shown in FIG. 2 to any fraction on any scale in FIG. 1 will result in an answer which may be on the right side set of scales of FIG. 1 (for answers less than 1) or on the left side set of scales of FIG. 1 (for answers greater than 1), but in no event will any answer ever exceed 2.

Between index lines 46 and 53 the slide 24 is provided with an area 64 bearing legends aforesaid identifying the scales 46 through 50 inclusive and a window 65 which will expose certain graduations on the scales 95–98 inclusive inscribed on the back of the base 23 when the slide 24 is assembled into the base as is shown in FIG. 4. Accordingly, answers appearing on the back of the base will be viewed through the window 65.

The reverse or "Fractinoal Parts" side of the slide 24 is shown in FIG. 3. This side bears non-cumulative scales of certain selected fractions and decimals to illustrate fractional and decimal parts. The scales on the left side set of scales shown in FIG. 3 are respectively identified by reference characters 66, 67, 68, 69, 70, 73 and 74 respectively for scales of one unit, ½, ⅓, ¼, ⅙, ⅛ and ¹⁄₁₂. The scales on the right side set of scales are each divided into both fractional parts and decimal parts and are identified by reference characters 75, 76 and 77 respectively for 5ths, 10ths and 20ths. There is also an additional one unit scale 78. As in the scales shown in FIG. 2, the scales shown in FIG. 3 have respective 0-lines 81, 82 and end index lines 83, 84.

The slide rule is also provided with a cursor 85 having a leaf spring 86 to frictionally bias it to remain in any position to which it is adjusted, and a hairline 87. The cursor 85 is slidable along the entire length of the base member 20 and the hairline 87 will intersect graduations on all exposed portions of the slide rule members lying therebeneath. The cursor desirably comprises a U-shaped strip of transparent plastic, the free ends of which are held by rivets 80, one of which providing an anchor for spring 86.

Illustrative examples of the use of the slide rule for teaching the arithmetic of fractions will now be given. Other uses and manipulations not specifically described will be apparent to those skilled in the art.

*Fractional Parts*

The "Fractional Parts" scales on the reverse side of the slide as shown in FIG. 3 may be used to prove to the student that the smaller the denominator, the larger the fraction. Looking at the left side set of scales in FIG. 3, it is clear that ½ is a larger fraction than ¹⁄₁₂, even though 12 is larger than 2.

The right side scales of FIG. 3 help establish for the student a graphic relationship between fractions and decimals.

The "Fractional Parts" scales of FIG. 3 are also used to demonstrate how fractional parts can be accumulated to equal a larger fraction or to equal unity. This amounts in one aspect to the addition of fractions having like numerators and like denominators. FIGS. 6, 7 and 8 illustrate how the slide rule is used to graphically demonstrate that ¹⁄₁₀ and ¹⁄₁₀ equals ²⁄₁₀. Inasmuch as the student already knows that .10 plus .10 equals .20, the results of the fractional accumulation are easily verified because the scales also bear the decimal notations which are used to check the answer. In FIG. 6 the "Fractional Parts" scale of the slide 24 is placed uppermost with the slide assembled in the base 20 and with the 0-line 81 of the right side set of scales on the slide aligned with the 0-line 26 of the base. The cursor 85 is moved to position its hairline 87 over the first graduation on the scale 76, counting from the right-hand 0-line on said scale. This position of the parts is shown in FIG. 6.

The next step as illustrated in FIG. 7 is to move the cursor to the left until its hairline 87 is over the next graduation of 1/10 on scale 76. The student has now accumulated two fractional parts of 1/10 each. The cumulative answer to such accumulation is learned by moving the slide 24 to the right until the left edge of the window 65 aligns with the hairline 87 of cursor 85 which is left unmoved. This position of the parts is shown in FIG. 8. The answer 2/10 on the "10ths" scale 96 of the base back appears under the hairline 87 and through the window 65.

At the same time the student could take note that he was accumulating two decimal parts of .10 each, as these are also shown on slide scale 76, and that the answer .20 also appears on scale 96 under the hairline 87 in FIG. 8. In addition to this, equivalent fractions of 4/20 and 1/5 appear through the window and fractional equivalent 24/120 appears on the bottom flange 22 of the base on scale 94.

As a further example of the learning process of accumulating fractional parts, FIG. 9 shows the results of accumulating five units of 1/20 each. The answer 5/20 and its decimal equivalent .25 appears under the hairline 87 through the window 65 and fractional equivalents appear on both the upper and the lower flanges 21, 22 of the base.

Inasmuch as the graduations on the scales simulate written notations of fractions, the foregoing steps also illustrate that for accumulation of fractional parts, the student must make the same number of movements of the cursor as he would have to make written notations of the fractional parts which he desires to accumulate. This further correlates use of the slide rule and the ultimate written and mental process which the student will acquire as he develops his mathematical skills.

For example, in order to accumulate 1 from fractional parts of 1/20 each, 1/20 would be written twenty times in written notation. An equal number of movements of the cursor are required to accumulate like fractional parts on the slide rule.

The fractional parts scales are also used to demonstrate the generalization that where the denominators of fractions are the same, the sum of the numerators of the respective fractions gives the answer to a problem of addition of such fractions.

The "Fractional Parts" scale can also be used to add fractions having numerators each equal to 1 and unlike denominators, although this is better done by using the "Cumulative Fractional-Decimal Scale."

Cumulative Fraction-Decimal Scale

The "Cumulative Fraction-Decimal Scale" side of the slide 24 as shown in FIG. 2 may be used to demonstrate graphically the addition of fractions in which the numerators thereof need not necessarily be one, as is necessarily in the case of addition of fractions on the fractional parts scale aforesaid. Inasmuch as the fractions are cumulative, the student can jump over intervening fractions in his process of accumulation. In using these scales, it is noted that all scales which are exposed to view, when the slide is assembled into the base, as shown in FIG. 4, are cumulative from right to left. The scales on the base all total 2, whereas the scales on the slide are divided into right and left side portions, each of which total 1.

FIGS. 10 and 11 illustrate the addition of fractions having common denominators, but different numerators. For example, to add on the slide rule of the present invention 1/4 plus 2/4, the rule is first positioned as shown in FIG. 10 with the hairline 87 of the cursor over 1/4 on scale 42 of the upper flange 21 of the base and with the slide 24 pulled over to the right to align its left side 0-line 82 with the hairline. In the next step, as shown in FIG. 11, the cursor is moved to the left to align its hairline 87 with 2/4 on the "4ths" scale 58 of the slide, which remains unmoved. The answer 3/4 is read on scale 42 on the upper flange of the base. Fractional equivalents such as 6/8, 9/12 and 90/120 are read on the appropriate scales 92, 93 and 94 on the bottom flange 22.

For the student to verify his answer by reference to the decimal equivalent thereof, the window 65 of the slide is moved to its position shown in FIG. 12 in which .75 appears under the hairline.

If, to this answer, a fraction of unlike denominator—for example 6/8—is to be added, the slide remains in its FIG. 12 position and the cursor is moved to the left until the hairline 87 is over 6/8 on scale 60 of the slide. The answer 1½ and all fractional equivalents thereof will now appear under the hairline on the upper and lower flanges of the base. To get the decimal equivalent of the sum and to check the addition, window 65 is moved to its position shown in FIG. 14 beneath the hairline 87 which remains unmoved and the fractional equivalent 1.50 appears on the back 23 of the base. Thus, the student can check the addition of 3/4 plus 6/8, both of which have the fractional equivalent of .75 and the total of which is 1.50.

Subtraction

To subtract one fraction from another, a converse procedure to that just explained is used. For example, to subtract 2/4 from 3/4, the parts of the slide rule are first positioned as shown in FIG. 11 in which the hairline 87 of the cursor is placed upon 3/4 on scale 42 of the upper flange 21 of the base and 2/4 on the scale 58 of slide 24 is placed under the hairline. Cursor 85 is then moved to the right to position its hairline 87 over the 0-line 53 at which point the hairline will intersect the answer 1/4 on scale 42, as shown in FIG. 10.

The foregoing examples of addition and subtraction of fractions are simply illustrative. All of the fractions on the scale can be added and subtracted in like manner. For teaching purposes, the fractions may be converted first by the pupil into their equivalent decimals or percents, so that the pupil can check intermediate and final sums and differences in terms of decimals or percents, as well as in terms of fractions. In this manner, sums and differences can be verified in terms of other types of mathematical computations, and this furnishes a basis for understanding the meaning and process of computation of such types of computation, as well as establishing the generalizations necessary to permit the student to compute with fractions, decimals and percents not given on the slide rule.

Multiplication

Multiplication of fractions can also be taught on the slide rule of the present invention. For example, to multiply 3×3/8, the pupil first converts the problem to the mathematical notation 3/8 plus 3/8 plus 3/8 and works the slide rule as for addition to get the answer of 1⅛ on the lower flange 22 of the scale. The student already may be aware that multiplication simply involves addition, a generalization which can be proven on the slide rule of the present invention as aforesaid.

The present slide rule is also uniquely adapted to add fractions to decimals. To add .75 to 6/8, the hairline 87 can first be positioned over .75 on scale 97 of the back 23 of base 20 as viewed through the window 65 in FIG. 12. In this position, the left side 0-line 53 of scale 60 is also under the hairline 87. The hairline is then moved to 6/8 on scale 60 as is shown in FIG. 13 and when the window is moved beneath the hairline as is shown in FIG. 14, the answer in either decimal or fraction form is read under the hairline as 1½ or 1.50.

*Addition and Subtraction of Fractions Having Unlike Numerators and Unlike Denominators*

Fractions having unlike numerators and unlike denominators are very readily added and subtracted on the slide rule of the present invention. Conversion to a common denominator is unnecessary when using the present slide rule; although for teaching purposes, the pupil would convert such fractions to a common denominator, make the addition mathematically, and in addition use the slide rule to determine the equivalent fractions having common denominators and to verify the results thus obtained. For example, to add ¾ and ⅔, the pupil would ordinarily be required to convert both fractions to their lowest common denominator, which in this case would result in the addition of $9/12$ and $8/12$. The sum of these fractions, which is $17/12$ or $1 5/12$ is first calculated mathematically, and can be quickly verified on the slide rule by adding ¾ and ⅔ as aforestated. The student can also verify the work by converting ¾ and ⅔ to their respective decimal equivalents, the sum of which is .141, as will appear on the slide rule on scale 97, it being necessary in this instance to interpolate somewhat on the decimal scale because the precise decimal is not given on the scale.

*Complex Fractions*

Complex fractions can also be added and subtracted. For example, 1½ plus 6⅔ can be added by first adding the whole number portions of these fractions, totaling 7, and then adding the fractional portions of these numbers, namely ½ and ⅔, in the manner aforesaid, to yield the proper sums, which is 1⅙, for a total sum of 8⅙, or 8.17 as a decimal equivalent.

The repeated use of the slide rule to solve problems using fractional numbers and mixed decimals, which appear on the scales with which the rule is provided, will enable the student to quickly establish the generalizations needed to solve any of the problems of the arithmetic of fractions, decimals and percents, involving addition, multiplication by a whole number, and subtraction, which do not appear on the slide rule. The slide rule also helps the student to understand fractions, decimals and percents, and their relation to whole numbers, complex fractions, and mixed decimals and percents.

The particular scales with which the rule is provided are limited only by the available space, and the scales illustrated in the annexed drawings are those which best fit onto proposed commercial embodiments of the slide rule. Larger slide rules could accommodate additional scales, although this is not believed to be necessary, inasmuch as the generalizations and basic principles of the arithmetic of fractions are readily grasped by manipulation of the slide rule of the present invention, even though the number of scales on the slide rule is limited.

I claim:

1. A slide rule having a base member and a slide member, both said members having scales graduated in fractions, the scales on the base member being graduated from 0 to 2 and the scales on the slide member having respective lengths equal to one-half the length of the scales on the base member and being divided into right and left side portions, the scales on each of said portions being graduated from 0 to 1.

2. A slide rule having a base member with scales graduated in fractions increasing in numerical value from 0 to 2 and a slide member with scales having a total length equal to one-half the length of the scales on the base member and graduated in fractions increasing in numerical value from 0 to 1.

3. The slide rule of claim 2 in which said slide member has another set of fractional scales arranged with the first mentioned slide scales into right and left side portions and graduated from 0 to 1, the fractions of the scales of said other set having different denominators than the fractions of the slide scales first mentioned.

4. A slide rule having a base member and a slide member both having scales, said slide overlying and concealing graduations on scales on the base member, said side member having a window slidable with the slide to selectively expose such graduations, the base scales being graduated in fractions increasing in numerical value from 0 to 2, the scales on the slide being divided into right and left side sets each graduated in fractions increasing in numerical value from 0 to 1, said window intervening between said sets to be disposed substantially midway of the ends of the slide.

5. A tool for teaching the arithmetic of fractions and comprising a slide rule having a base member, a slide member, and a cursor, both of said members having scales graduated in cumulative fractions, the graduations on the base scale increasing in numerical value from 0 to 2 and the graduations on the slide increasing in numerical value from 0 to 1.

6. The device of claim 5 in which the scales on the slide member are divided into right and left side sets, each set having a length equal to one-half the length of the scales on the base member.

7. The device of claim 6 in which the slide covers at least some of the scales on the base, said slide having a window through which certain graduations otherwise thus concealed will be exposed.

8. In the art of teaching the arithmetic of fractions using as a teaching tool a slide rule having a base member, a slide member and a cursor, said members having scales graduated in fractions and complementary scales graduated in decimals, said cursor having a hair line transverse to and intersecting both the fractional and decimal scales, the method comprising the steps of manipulating the parts of the rule first to solve an arithmetic problem on the fraction scales and then verifying the fractional answer thus obtained by reference to a corresponding answer in terms of a decimal, both answers intersecting the hair line of the cursor.

9. The method of claim 8 in which the decimal scale is covered by the slide member, said slide member having a window through which a portion of the decimal scale is visible, and including the step of moving the slide member to align the window with the hair line of the cursor to expose the decimal answer therethrough.

10. In the art of teaching the arithmetic of fractions using as a teaching tool a slide rule having a base member, a slide member and a cursor, said members having scales respectively graduated in cumulative fractions and fractional parts, said cursor having a hair line transverse to and intersecting both the cumulative fraction scale and the fractional parts scale, the method comprising the steps of manipulating the parts of the rule first to accumulate successively fractional parts under the hair line of the cursor on the fractional parts scale and then verifying the accumulated answer thus obtained by reference to the cumulative fraction appearing under the hair line of the cursor on the cumulative fraction scale.

11. The method of claim 10 in which the cumulative fraction scale is covered by the slide member on which the fractional parts scale is inscribed, said slide member having a window through which a portion of the cumulative fraction scale is visible, and including the step of moving the slide member to align the window with the hair line of the cursor to expose the cumulative fraction answer therethrough.

12. In the art of teaching the arithmetic of fractions using as a teaching tool a slide rule having a base member with scales graduated in cumulative fractions increasing in numerical value from 0 to 2 and a slide member with scales divided into right and left side sets of dissimilar fractions each having a length equal to one-half the length of the scales on the base member and graduated in cumulative fractions increasing in numerical value from 0 to 1, each set of scales having a 0-line, and a cursor having a hair line transverse to and intersecting the scales on the base member and the scales on one of said sets on the slide member, the method comprising the steps of first selecting a scale on one or the other of said right and left sets on the slide member, manipulating the parts of the rule with reference to said selected scale and the 0-line of the set of which said scale is a part and a scale on the base member and reading the answer on the base scale.

References Cited in the file of this patent

UNITED STATES PATENTS

| | | |
|---|---|---|
| 762,546 | Merrill | June 14, 1904 |
| 1,541,871 | Stillman | June 16, 1925 |
| 1,568,475 | Schwanda | Jan. 5, 1926 |
| 2,422,421 | Kaufman | June 17, 1947 |
| 2,914,865 | Hall | Dec. 1, 1959 |

FOREIGN PATENTS

| | | |
|---|---|---|
| 621,133 | Great Britain | Apr. 5, 1949 |
| 737,334 | Great Britain | Sept. 21, 1955 |
| 1,127,639 | France | Aug. 13, 1956 |